L. LYNDON.
SYSTEM OF ELECTRIC GENERATION, DISTRIBUTION, AND CONTROL.
APPLICATION FILED JULY 6, 1905.

948,736.

Patented Feb. 8, 1910.

L. LYNDON.
SYSTEM OF ELECTRIC GENERATION, DISTRIBUTION, AND CONTROL.
APPLICATION FILED JULY 6, 1905.

948,736.

Patented Feb. 8, 1910.
5 SHEETS—SHEET 3.

Fig. 3

Witnesses:
Chas. D. King
Benj. Roman

Inventor:
Lamar Lyndon

UNITED STATES PATENT OFFICE.

LAMAR LYNDON, OF EAST ORANGE, NEW JERSEY.

SYSTEM OF ELECTRIC GENERATION, DISTRIBUTION, AND CONTROL.

948,736.  Specification of Letters Patent.  Patented Feb. 8, 1910.

Application filed July 6, 1905. Serial No. 268,321.

*To all whom it may concern:*

Be it known that I, LAMAR LYNDON, a citizen of the United States, residing in the city of East Orange, county of Essex, State of New Jersey, have invented certain new and useful Improvements in Systems of Electric Generation, Distribution, and Control, of which the following is a specification.

This invention relates to systems and apparatus for the generation, distribution and control of electric current and has been developed more especially with a view to a solution of the difficulties incident to the variations in speed of the source of power by which the generator is driven.

The particular application of this invention and the principal purpose for which it was developed is that of railway car lighting in which current is generated by a dynamo driven from the car axle.

The object of this invention is to produce a system which is reliable in its operation and in which there will be no moving contacts, brushes, moving wires, switches, pole changers, nor regulating mechanism of any kind underneath the car, and thereby to eliminate the principal sources of the present troubles and difficulties that are inherent in all existing electric train lighting systems. Preferably, also, is all driving gear dispensed with, though this feature is not a limitation of the invention.

Another object is to maintain a better and more even condition of the charge in the storage battery, thus prolonging its life and reducing the repairs necessary.

Further objects of the invention will hereinafter appear.

Briefly, the salient features of the invention consist of an alternating current dynamo in which both the field and armature windings are stationary, being fixed in a magnetic frame work, and a rotating mass of iron—called the inductor—which, by reason of its configuration causes a change in the degree of magnetization through the fixed armature coils when rotated, thus setting up an alternating E. M. F. Current is taken from the armature winding through a static rectifier, either the well known aluminum plate form or the mercury vapor rectifier. The alternating current being converted into direct current passes to the distribution circuit where it supplies current to lamps, fans, or other translating devices, and charges a storage battery. The battery is used, as is customary in systems where the source of dynamo driving power is variable and intermittent, for supplying current when the speed of the dynamo is zero or below some predetermined value. The battery also serves to excite the generator fields. Certain forms of automatic regulators are required to regulate the dynamo voltage independently of the speed at which the dynamo may be driven.

The following drawings show forms of systems embodying my invention.

Figure 1:
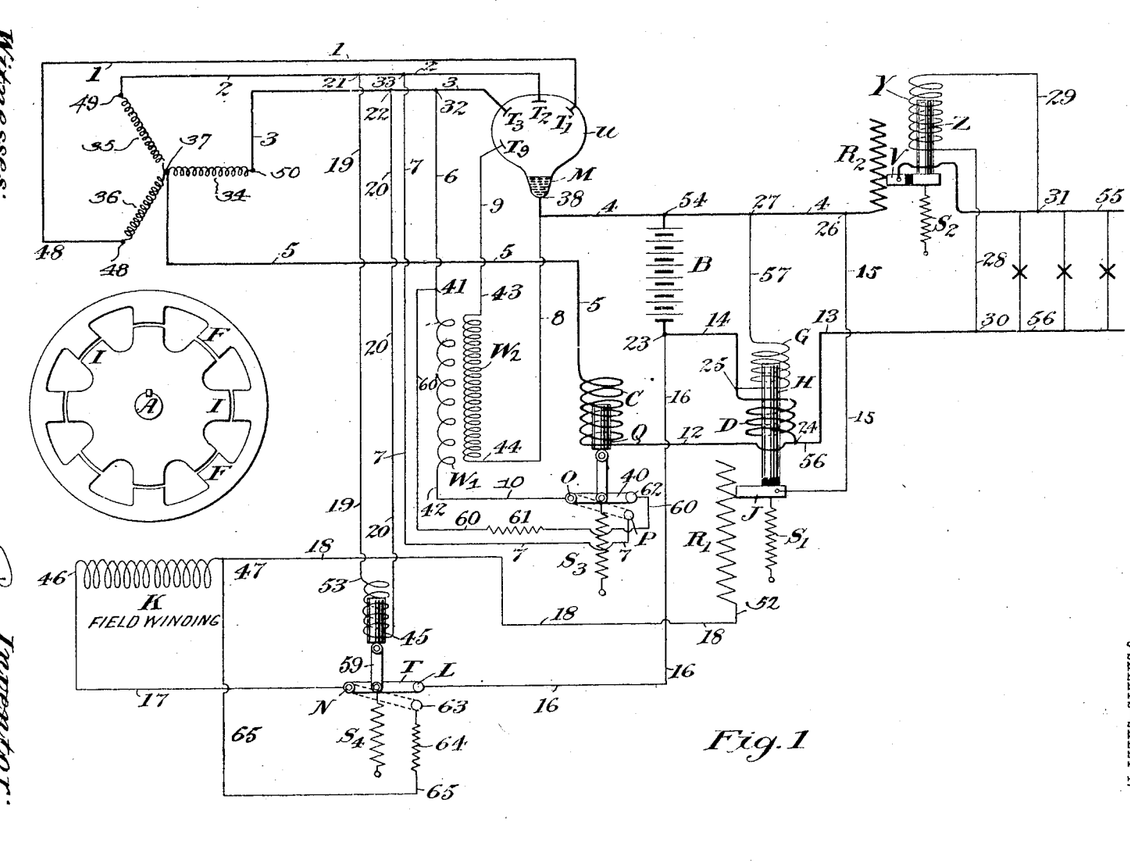
Figure 1 is a diagrammatic representation of a complete system, using a mercury vapor rectifier in which the alternating current generator supplies three phase currents.

In Fig. 1, F is the stationary field and armature frame which is concentric with the inductor I, the latter being mounted on a driving axle A—preferably the car axle itself. Wires 1, 2, and 3 are the leads from the three phase armature winding, which is stationary, being wound on the frame F. The armature winding is indicated at 34—35—36 as being separated from the magnetic frame, to show, more clearly, the connections. Leads 1, 2, and 3 from the armature terminals go to terminal plates $T^1$, $T^2$ and $T^3$ respectively, in the glass bulb U, which is sealed and contains mercury vapor with mercury in the neck at the bottom, shown at M. This mercury-vapor filled bulb with its terminals and connections forms the well known mercury-vapor rectifier. A wire 4, connected to the body of mercury M, forms one side of the direct current circuit, while the wire 5 taken from the neutral point 37 of the generator forms the other side of the direct current circuit. In order to start the operation of the mercury vapor rectifier it is necessary either to tilt the bulb so that the mercury may run from point 38 to one of the terminals $T^1$, $T^2$ or $T^3$, or the bulb must be agitated, or a high voltage must be impressed across the tube—from 1000 to 1500 volts—to start ionization of the mercury vapor. The last named method is the preferable one, and to this end the transformer $W^1$, $W^2$ with the automatic switch 40 have been devised. $W^1$ is the primary winding of a small step-up transformer, and $W^2$ the secondary. $W^2$ is connected preferably to the auxiliary or starting terminal $T^9$, by wire 9 and to terminal 38 by wire 8. Low tension alternating current circulating in the secondary $W_1$ will induce a high E. M. F. in $W^2$ and therefore impress across the tube from $T^9$ to 38 a high voltage which starts the ionization of the mercury vapor and causes the operation of the rectifier to begin. $W^1$ is connected at one terminal with main 3 by wire 6. The other terminal is connected to main 2 via solenoid switch 40, wire 10 joining $W^1$ to contact O which is a pivot about which blade 40 turns, and wire 7 joins contact P and main 2. The movable conducting piece 40 joins contacts O and P when lowered, thus completing circuit from the lower terminal 42 of $W^1$ to main 2. When 40 is raised and no longer touches P, the circuit through $W^1$ from mains 2, 3, is opened and no current flows through $W^1$. In order to avoid the building up of injurious inductive voltages when the circuit is opened, switch point 62 is provided and joined to terminal 41 of $W^1$ through the wire 60 and resistance 61. When the blade 40 moves from P to 62 it contacts with both of these points during a portion of its travel, allowing the coil $W^1$ to discharge through resistance 61 when the circuit from O to P is broken. 61 prevents short circuiting between mains and during the time that the blade 40 joins contacts P and 62. The spring $S^3$ tends to draw the blade 40 downward to the contact P while the solenoid winding C acting on the core Q tends to draw the blade away from the contact P and toward contact 62, blade 40 being attached to core Q and spring $S^3$, as shown. Since the winding C, is in series with the main circuit from the dynamo, through the rectifier, this winding is energized whenever any current passes through the rectifier to the distribution circuit. Therefore, whenever current passes from the dynamo to the distribution circuit the switch blade 40 is moved away from contact P to contact 62 by the magnetic pull on core Q which will overcome spring $S^3$, the adjustment and proportioning of parts being such that this movement takes place with very small current through C. This opens the circuit through $W^1$ and the starting transformer is no longer in operation. K, the generator field winding is connected at terminal 46 to one side of the battery B at 23 through wires 17 and 16, passing through automatic switch T, wire 17 leading from 46 to contact N and wire 16 from contact L to 23. The moving, conducting piece T, which coöperates with contact L and is pivoted about N, joins them together when drawn upward, thus completing the circuit from terminal 46 to point 23. In order to prevent the building up of injurious electromotive forces when the inductive field winding has its circuit opened, the switch T is arranged similarly to switch 40 before described. Auxiliary contact 63 is connected through resistance 64 by wire 65 to terminal 47 of field winding K. As the switch blade T is pulled downward by spring $S^4$, it makes contact with 63 before it leaves L, thus joining the two terminals of the field winding K through resistance 64 before interrupting the circuit. This allows the field to "discharge" as the circuit is opened. The resistance 64 also prevents the battery from being short circuited during the time that switch blade T touches both contacts L and 63. The other terminal 47 of field winding is connected through variable resistance $R^1$ and its movable coöperating contact J to the other side of the battery, the wire 18 leading from 47 to terminal 52 of $R^1$ and contact J being connected to battery terminal 54 by wire 15 to point 26 on distributing main 4, and thence by the main 4 to 54.

Switch T has a winding 53 which is connected on one side through wire 19 to A. C. main 2, the other side being joined to main 3 by wire 20. Coil 53 is therefore energized with alternating current whenever the generator is running. The winding 53 tends to draw in the core 45, and this tendency is opposed by the spring $S^4$. Switch blade T is attached to core 45 and is drawn up to contact point L whenever the magnetic pull exceeds that of the spring $S^4$, thereby completing the circuit from battery through the field winding, and exciting the dynamo field. The winding 53 and spring $S^4$ are so proportioned that a very low voltage—say two volts—will give sufficient excitation to draw in the core 45 and close the circuit from L to N. The dynamo is designed to have a high residual magnetism so that this voltage may be easily attained without excitation of the field winding at speeds below the minimum speed of operation of the system. At such low speeds, the frequency of the alternating current is comparatively low and the inductive E. M. F. opposing the flow of magnetizing current is small, thus allowing a sufficient current to flow through winding 53 to give the necessary magnetization. As the speed rises and the voltage also increases, the correspondingly higher frequency prevents an excessive current flow through winding 53, by reason of the higher inductive E. M. F. of this winding. This switch then, automatically closes the circuit from the battery through the field winding when the generator is driven at a certain predetermined speed, and opens the circuit cutting off the flow of battery current through the field winding when the generator speed is below this value; at the same time, allowing the field discharge to take place. The voltage of the generator is maintained at the required value, by means of the automatically varied resistance $R^1$ with which, moving contact J, coöperates. Contact J is fastened to, but insulated from the core H, which is acted on by the combined magnetizing effect of windings D and G. Opposing the magnetic pull on the core H is the spring S, tending to draw out the core. The contact J will therefore be moved along the resistance $R^1$ with variations in magnetization of H. When the magnetic pull is increased the core will be drawn into the coil, extending the spring, until the increased pull of the spring due to its extension equals the magnetic pull. Conversely: If the magnetic pull should decrease the spring will draw out the core until the decreased pull of the spring due to its contraction equals the smaller magnetic pull. The parts are so designed and proportioned that very small changes in magnetization will produce a wide range of movement of the core H and a correspondingly great variation in the resistance $R^1$.

It is not intended that the voltage of the dynamo shall be maintained constant as this is not the proper way to attain the best results in the operation of a system of this kind. The rate of charge of a storage battery should be varied with its state of charge. A battery which is fully discharged or nearly so, should be recharged at a very high rate. This rate should be gradually diminished and stopped entirely when the voltage reaches 2.5 volts per cell—this being the value for lead-sulfuric-acid cells. Low charging rates at the beginning, high rates at the end of charge, and a continuation of charging current after the battery is fully charged, are all detrimental and injurious to the cells, and greatly shorten their life. To accomplish this adjustment of the charging rate, the coils D and G are magnetized by, and in proportion to, the battery current and the potential of the battery respectively. The circuit passes from point 37 to C by wire 5, through C to point 24 by wire 12, at which point the circuit divides, one portion leading directly to the lights and translating devices X X X by wire 56, and the other path leading to the battery through coil D and to B by wire 14. The coil G has one terminal connected to the battery terminal 54 through wire 57 to point 27 on main 4, which latter is joined to 54. The other terminal of G is joined to the opposite battery terminal 23 through wire 14, this terminal of G being at point 25 on wire 14. The magnetization due to G, therefore is always proportional to the voltage across the battery terminals. The magnetization of G and D are cumulative and the total magnetization of the two coils is the arithmetical sum of their separate magnetizations when current flows through D to the battery. However, when current flows from the battery the magnetization of D is reversed in direction and the coils D and G oppose each other, the total magnetization of the two coils being their difference. Increase in total magnetization tends to move H and with it J in a direction to increase the resistance $R^1$, while decrease in total magnetization will move J in a direction to decrease the resistance $R^1$. Since the generator field excitation varies proportional to the change in resistance $R^1$, it follows that increase in resultant magnetization of the windings D and G decreases the excitation of the generator, while a decrease in the resultant magnetization of D and G increases the generator excitation.

The operation of this device is as follows: When the train is at rest and the lights turned on, current passes from the battery through coil D in a direction to produce a magnetization opposed to that of coil G, if G be connected to the battery, and the resultant magnetization of the coils G and D is not great enough to overcome the spring $S_1$. Core H, therefore, takes its lowest position cutting all resistance out of the field circuit. If the train be at rest, and no lights turned on, and coil G only acts to magnetize the core H, the pull due to coil G is not sufficient to overcome spring $S_1$, unless the potential of the battery be 2.5 volts per cell, in which latter case no current from the dynamo is necessary or desired. No matter therefore what the condition of the lighting circuit, the core H is at its lowest position and all resistance is cut out of the field circuit when the train is at rest except when no current is being used in the train and the batteries are fully charged. When the train speed is sufficiently high for the voltage of the generator due to the remanent magnetism of the fields to close the switch T, the generator field is fully excited with the full battery voltage across its terminals. This results in a high voltage as the train increases its speed, and a heavy current tends to flow through coil D to the battery, the magnetization of D being added to that of G. The sum of these magnetizations will overcome the pull of spring $S_1$ and draw up core H. This upward movement will reduce the field excitation and therefore the current flowing through coil D to the battery. As the battery approaches a state of full charge, its counter E. M. F. increases, thereby decreasing the current flow through coil D. The reduced magnetization allows the spring $S_1$ to lower the core and decrease the resistance in the field circuit, thereby increasing the generator voltage, and raising the current to the battery, through D, to the desired value. If the current through D should become too great, the increased magnetic pull will raise the core and reduce the generator voltage, thereby reducing the current flow to the battery. Since any increase in generator voltage correspondingly increases the pull of coil G, the required magnetization of D to balance the pull of the spring $S_1$ is decreased so that the charging current to the battery gradually diminishes, and when the battery is fully charged, is practically zero. The battery potential when practically discharged is about 2 volts per cell, and when fully charged is about 2.5 volts per cell. By properly proportioning the coils G and D, and the pull of $S_1$, it is possible to produce a gradually decreasing rate of battery charge. The proportions are substantially as follows:

$$P = Q(SI + 2NK) = Q\,2.5\,NK$$

in which P = pull of spring; S number of turns in coil D; I = maximum current to battery when battery is fully discharged; N = number of cells in the battery; K = ampere turns in coil G for each volt impressed across its terminals, and Q = magnetic pull on core H per ampere turn of winding. This relation shows that the ampere turns of D, and consequently the current through this coil to the battery, reduces to zero when the battery is fully charged. The sum of the ampere turns of G+D is maintained substantially constant.

The voltage necessary to charge a battery is in excess of the voltage of battery discharge and as the lamps are at times supplied with current from the battery, the voltage of the lamp circuit is lower than that from the generator and rectifier impressed on the battery. Furthermore this impressed voltage is variable as has been explained. Therefore a device for maintaining a constant potential across the lamp mains 55, 56, must be employed. This consists of a resistance $R^2$ and a moving contact V cooperating therewith, so that as V moves the resistance $R^2$ is varied. The path of the current to the lamps is from junction joint 24 by wire 56, through the lamps X X X to wire 55 to contact V, through $R^2$ by main 4 to junction point 54. Since junction points 24 and 54 connect with both the generator rectifier circuit and the battery circuit, the current to lamps may be supplied by either, passing in any case through resistance $R^2$. Manifestly any variation in the resistance will vary the drop through it and therefore the voltage impressed across the lamps. Contact V is attached to, but insulated from core Z, which is surrounded by winding Y, which winding is connected across the lamp circuit by wires 28 and 29. The pull of Y on Z is therefore proportional to the voltage impressed across the lamp circuit. Spring $S^2$ opposes this pull, being attached to core Z, either directly or by some intermediate mechanism. If the voltage across the lamp circuit should rise, the increased pull of Y would cause a movement of Z extending the spring and moving with it the contact V to increase the resistance of $R^2$, thus diminishing the voltage across the lamp circuit. Conversely, a decrease in the lamp circuit voltage results in a diminution of the pull of Y and the spring pull overcoming the magnetic pull, the core Z with the contact V moves in a direction to reduce the resistance $R^2$, and thus raise the voltage of the lamp circuit. The parts are so designed and proportioned that slight voltage changes will produce a wide range of motion of core Z and a correspondingly great change in the resistance $R^2$.

The operation of this system is as follows: When the car is at rest—assuming that the system is applied to a railway car for lighting purposes—there is no rotation of the inductor I, and consequently no E. M. F. from the generator. No current flows to or through the rectifier U from the armature windings. The battery B discharges through the lamp load X X X, passing through coil D, in a direction such that the magnetization of D opposes that of G. The reduced magnetic pull due to this differential action of the two coils allows spring $S^1$ to pull the core H, and with it contact J, to their lowest position, thus cutting all resistance $R^1$ out of the field circuit. The battery current also passes through $R^2$ and by reason of the previously explained action of the coil Y on core Z controlling the resistance $R^2$, the potential at the lamps is maintained at its proper value, the resistance diminishing as the battery voltage decreases. Since no current is passing through coil C, the core Q is not held up by any magnetic pull and spring $S^3$ draws the core together with switch-blade 40 downward, completing the circuit from alternating mains 2, 3 through transformer winding $W^1$. There being no E. M. F. impressed on coil 53, core 45 is no longer supported by its pull, and spring $S^4$ draws down both the core and the switch-blade T, thereby opening the circuit from the battery through the field, and preventing the loss of battery current. As the car begins to move, inductor I rotates and as the speed increases, the voltage induced, in the armature windings, due to the action of the residual magnetism of the inductor and its speed, becomes appreciable. At a speed corresponding to a train speed of 10 miles per hour this voltage rises to say two volts. This potential is sufficient to cause a magnetization of coil 53 of switch T that will overcome spring $S^4$. The switch blade, therefore, moves upward to contact L and battery current flows to field winding K, energizing the generator field, and resulting in the production of normal generator E. M. F. Switch 40 is closed on contact P and consequently the alternating E. M. F. of the generator has been impressed across transformer primary $W^1$, inducing a higher E. M. F. in secondary winding $W^2$. As the generator E. M. F. and frequency increase, the induced voltage of $W^2$ increases until it reaches a value sufficiently high to discharge from $T^9$ to M, thus ionizing the mercury vapor and "starting" the rectifier. These discharges continue until the generator voltage becomes sufficiently high to send a current through the rectifier to the battery or lamps. As the direct current begins flowing out from the rectifier, coil C is energized, and core Q is drawn upward lifting with it switch-blade 40. As this blade touches contact 62, and then leaves contact P, the discharge of $W^1$ is taken up in the resistance 61 and the circuit through $W^1$ opened, thus automatically cutting the starting transformer out of circuit, after which it remains idle until the next period of "starting" the rectifier. As the speed still further increases the voltage becomes so high that an excessive current begins to flow into the battery. This high current causes a strong magnetization of D and its effect added to the pull of G is to raise the core H and with it contact J, thereby increasing the resistance $R^1$ and diminishing the current through field winding K, thus bringing the generator voltage back to its normal value. As charge proceeds, the battery voltage increases, increasing the ampere turns and the pull of coil G. A corresponding diminution in the ampere-turns of D must take place, otherwise the core H will be drawn up and the resistance $R^1$ increased, thereby diminishing the generator voltage and reducing the battery charging current. When the battery voltage is equal to 2.5 volts per cell, the pull of G alone is sufficient to oppose spring S and charging current practically ceases to flow. Meantime current is also supplied to the lamps, passing through resistance $R^2$, where it is automatically regulated for lamp potential, as before described. As the car begins to slow down the voltage from the generator diminishes until the battery begins to discharge into the lamp circuit. This not only reduces the E. M. F. at the battery terminals, and therefore the pull of G, but the battery current passes through D in such a direction as to cause a magnetization opposing that of G. The resultant magnetization produces a pull that is easily overcome by spring $S^1$; core H and contact J are pulled downward, diminishing resistance $R^1$, and increasing the field current. This tends to bring up and maintain the generator voltage at the lower speed, and not until the speed falls below the predetermined operative value—say 16 miles per hour—does the generator voltage fall below that of the battery. When the speed becomes less than the operator value, current no longer flows through C and switch 40 closes the starting transformer circuit in readiness for the next "start." The battery sends current to the lamps through D and the differential action of the magnetization of this coil allows the spring S' to pull core H and contact J to their lowest points where all of resistance $R^1$ is cut out. As the speed and generator E. M. F. are further reduced, spring $S^4$ pulls down core 45 and switch blade T, opening the field circuit, and at the same time allowing it to "discharge." As the car is again started and brought up to speed the cycle is repeated.

Figure 2:
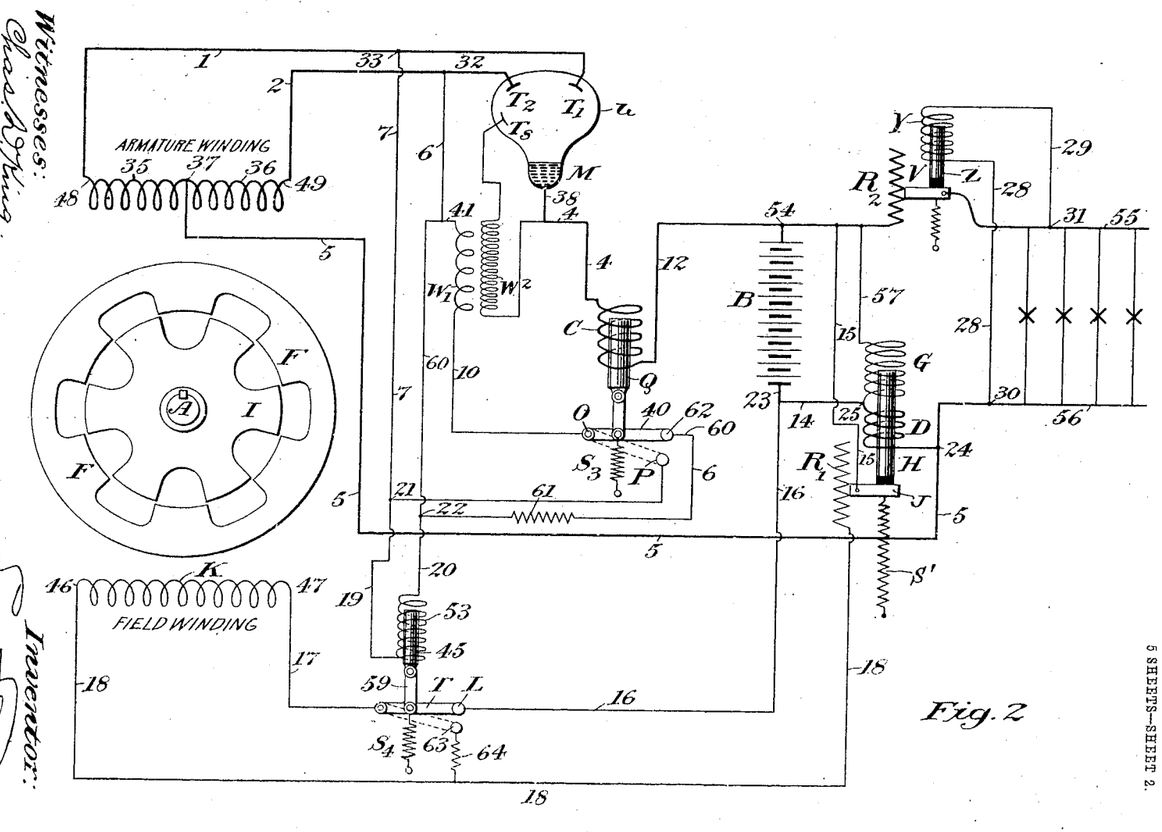
Fig. 2 is a similar diagrammatic representation with a single-phase generator.

Fig. 2 shows the arrangement for distribution from a single-phase alternating current generator. As in Fig. 1 A is the driving axle, I the inductor, F the magnetic frame, and U the rectifier. The armature winding is indicated at 35, 36, as being separated from the magnetic frame F. The entire coil forms a single winding from terminal 48 to terminal 49. 37 is the middle point on the winding to which is connected main 5, which forms one side of the direct current circuit. Mains 1 and 2 lead from armature terminals 48 and 49 to rectifier terminals $T^1$ and $T^2$, respectively. The direct current main 4 leaves the rectifier at 38, and with main 5 forms the two outsides of the direct current circuit. The mercury vapor rectifier will cease working on single phase current unless an inductance be put in series with the direct current branch leading from it. This inductance serves to prevent the cessation of current flow and consequent stoppage of ionization of the mercury vapor, during those periods of the cycle when the current flow from the generator is zero. The coil C of the automatic transformer switch 40 is therefore put in the main 4 from the rectifier, and serves both as the necessary rectifier inductance and the solenoid for operating switch 40. With these differences the functions of all the various elements are exactly as set forth in the description of the three-phase generator system shown in Fig. 1. The several parts are lettered and numbered to correspond with similar parts in Fig. 1. This system is, of course, equally adapted for use with any other form of rectifier.

Figure 3:
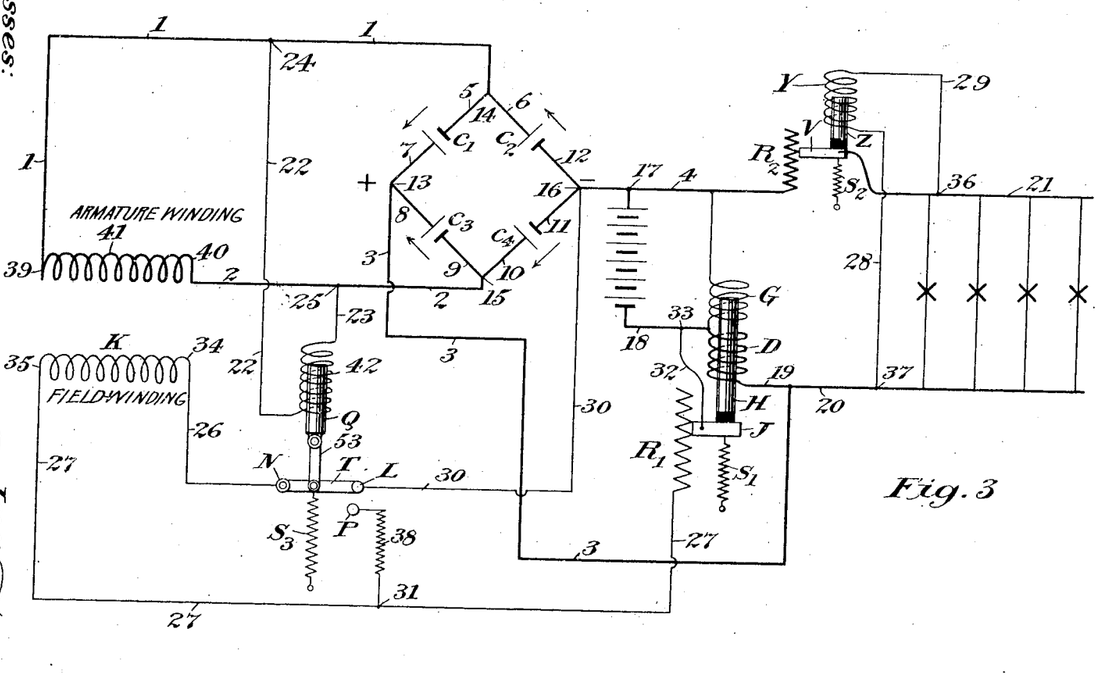
Fig. 3 is a diagrammatic representation of a system using aluminum plate rectifiers, the generator being single phase.

Fig. 3 shows the arrangement as used with aluminum rectifiers, being shown only diagrammatically. 41 is the armature winding of a single phase alternating current generator, having terminals 39, 40. K is the field winding having terminals 34, 35. From armature terminal 39 main wire 1 goes to point 14, from which point wires 5 and 6 lead to aluminum rectifier cells $C^1$, $C^2$, respectively. From the other side of $C^1$ wire 7 goes to point 13, while from the other side of $C^2$ wire 12 goes to point 16. Main wire 2 goes from the other terminal 40 of the armature winding to junction point 15 and leads 9 and 10 from 15 to aluminum cells $C^3$ and $C^4$, respectively. The other side of $C^3$ is joined to point 13 by wire 8 and the other side of $C^4$ to point 16 by wire 11. From the point 13, the direct current main 3 goes to the battery and translating devices, while direct current main 4 goes from point 16 to the opposite side of the direct current circuit. As is well known an aluminum electrode has the peculiar property, when immersed in certain electrolytes, of opposing the flow of current from it through the electrolyte to another electrode also immersed in the same bath, though it sets up no opposition to current flow from the second electrode to itself. That is, current may pass freely in one direction through the cell but not in the other. In the drawing at $C^1$, $C^2$, $C^3$ and $C^4$ the long lines represent aluminum plates while the short thick lines indicate iron or carbon plates. The arrow at the side of each cell shows the direction in which current may pass through the cell. If, for the instant, alternating current main 1, is positive and 2 negative, current flows to junction point 14, thence through $C^1$, as indicated by the arrow, to point 13, which is positive. From 13 the flow is through the distribution circuit by direct current wire and back to point 16 via wire 4. From 16 the current passes through $C^4$ to point 15 and thence to the negative (instantaneous) terminal 40 of the armature winding. Current cannot pass from 14 to 16, nor from 13 to 15, hence there are no short circuits. If now the terminal 39 becomes negative and 40 positive, current passes to point 15 thence through $C^3$ to 13, which is again the positive terminal. By wire 3 it passes through the work circuit and back to point 16, thence to point 14, passing through $C^2$ and by main wire 1 to terminal 39. Current cannot pass from 15 to 16, nor from 13 to 14 and therefore there are no short circuits. Also by tracing the circuits, it is seen that the battery cannot discharge back through the generator armature when the machine is at rest. The junction point 13 will always be positive, while the point 16 will be negative, and therefore the current to the distribution circuit will be unidirectional. The generator field regulating device with its double winding, the automatic field circuit switch, and the lamp potential regulator are all exactly in form and operation as has been before described.

Obviously, static transformers may be used in the alternating current circuits whenever it may be considered desirable to raise or lower the voltage of any of these circuits. Also it is noted that the before described systems are merely diagrammatic and only set forth the principles on which this system is based. In certain of the elements, motion multiplying devices, such as levers, gears, electrical relays and the like, will be used.

In order to easily mount the generator on the truck and drive the same from the axle without the interposition of driving gears, the field frame and inductor are preferably made in halves like a split pulley, with proper flanges and bolts to join the halves rigidly together, making a continuous rigid circular structure.

Figure 4:
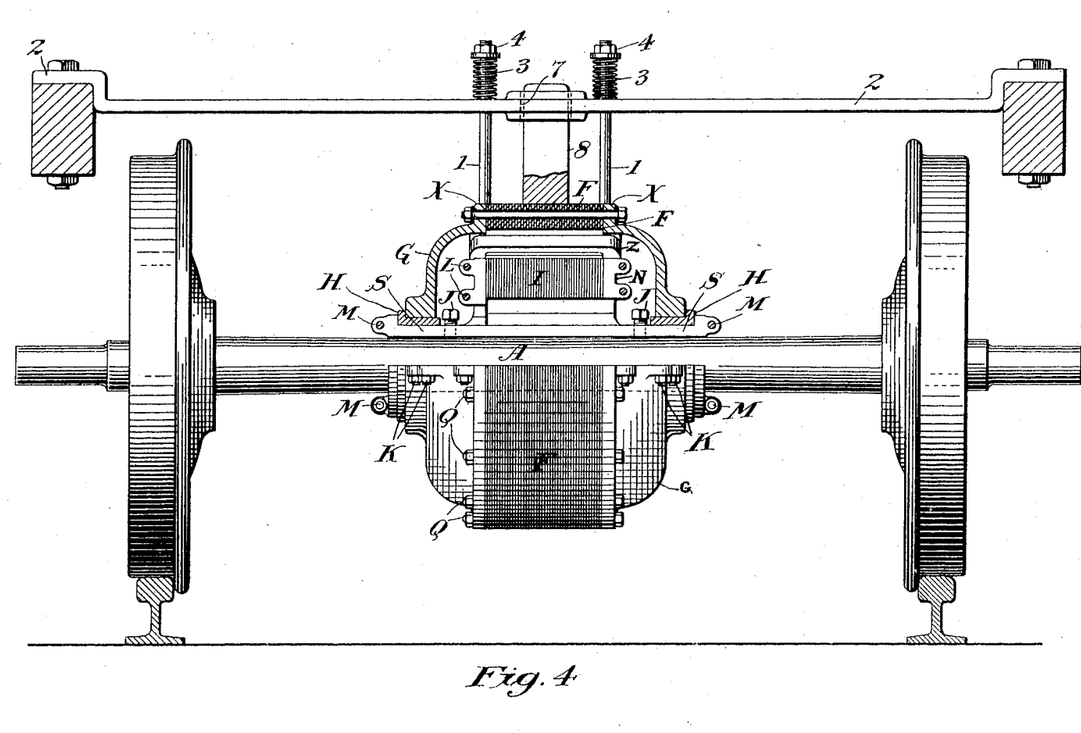
Figs. 4 and 5 show preferred methods of dynamo construction and suspension.
Figure 5:
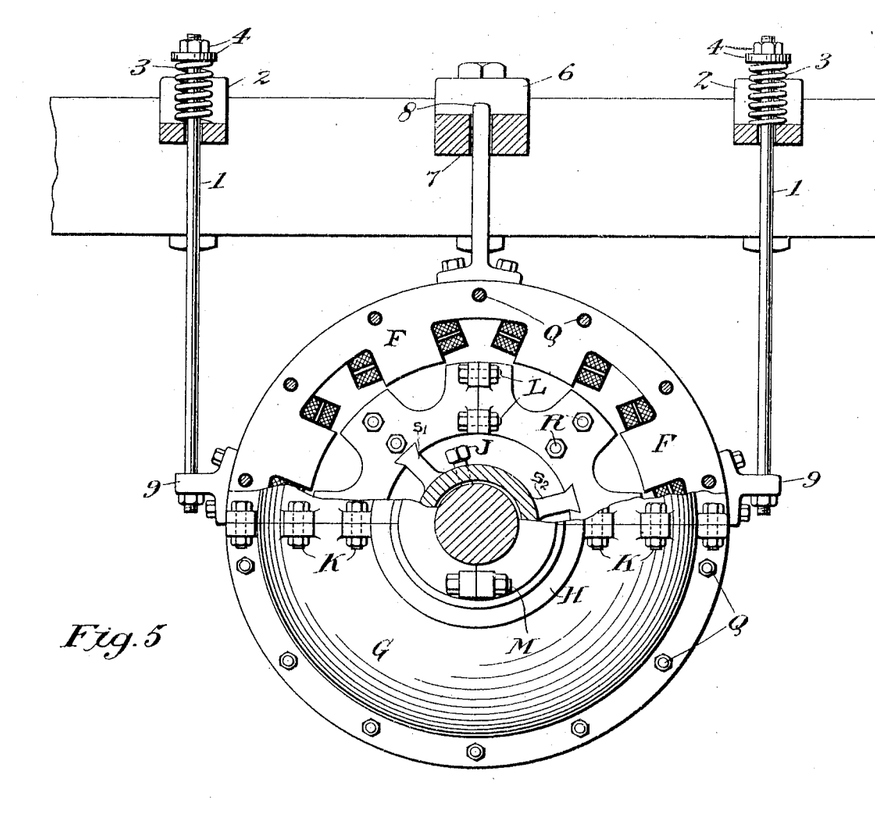

Figs. 4 and 5 show one method of making up the inductor. The inductor I is made up of laminations of soft iron, having the proper shape to cause shifting and reversal of magnetic lines through the magnetic structure F, in which the windings Z are placed. The laminations in I are held in place on a non-magnetic spider S, having the usual supporting and driving spokes $S^1$, $S^2$, $S^3$, and the clamping plate N, as is well known in the art. The spider shaft S is hollow as shown. The entire structure is split axially into halves and when re-assembled, the halves are held together by the lugs and bolts L, L, L, L, on the spider and clamping plates, and M, M, M, M, on the ends of the hollow shaft S. Set screws J, J, J, J, passing through the hollow shaft S, serve to center the structure about the driving axle A which passes through hollow shaft S, and hold same firmly. Brass wedges or other devices well known in the art may be substituted, however, if desired. With this construction the inductor may be split by removing bolts L, L, L, L, and M, M, M, M, the halves put over axle A and again bolted together, after which it is clamped to the axle and centered by set screws J, J, J, J. The magnetic framework F is also preferably made up of soft laminated iron clamped between the two end pieces G G, which have flanges X X that abut against the laminated mass, the whole being held and clamped together by means of bolts Q, Q, Q, Q, which are spaced around the circumference of the structure, and pass through the laminations and the flanges X X. The laminations are sectors only, and do not extend more than one half the distance around the circle formed by these sectors. The end pieces G are of a spheroidal shape, as shown and are provided with circular openings at their outer ends to carry the journals H, H. These end pieces G, G, are split axially into halves, which may be separated, put around the axle and the inductor, and then joined solidly together by means of lugs and bolts K, K, K, K. The journals H, H are also split axially into halves, but have no lugs nor bolts to hold them together, as the end frames G, G hold them sufficiently. They are provided with flanges on either end, as shown, to prevent lateral displacement. The magnetic frame F is shown in Fig. 5 as having polar projections on which the windings are placed. This form is preferable owing to the greater ease of connecting the separate windings together after the frame has been split and put in place over the axle A and inductor I. A distributed winding, however, may be used if desired. The whole structure forms a completely inclosed, light dynamo of simple and solid construction. It is, however, to be understood that this form is merely shown here as illustrative of the character of the system and the invention is by no means limited by this design.

The method of suspension is preferably as indicated in Figs. 4 and 5. Rods 1, 1, are fastened into lugs 9, 9, on the outer frame. These rods pass upward through iron cross pieces 2, 2, which run from one truck beam across to the opposite one. Compression springs 3, 3, 3, 3, through which the rods 1, 1, 1, 1, pass, support the weight, the upper ends of the springs pressing upward on the washers and nuts 4, 4, 4, 4, of the rods 1, 1, 1, 1, and the lower ends resting on the cross pieces 2, 2. The springs are adjusted to exert a pressure just equal to the weight of the dynamo so that the car axle is relieved of this weight. This flexible support allows the dynamo to rise and fall with respect to the truck as the car wheels and axle rise and fall.

The magnetic drag on the field frame F which tends to cause it to rotate with the inductor is resisted by the piece 8 which is fastened to and projects outwardly from the field frame. This piece projects up into an opening 7 which is formed in an iron cross bar 6, this bar being also fastened to the truck beams. The torque of F in either direction is resisted by the sides of the opening 7 in the cross beam 6, acting against 8. Vertical motion, however, is not restrained and the necessary motion of the dynamo with respect to the truck is not interfered with.
There are many possible variations of this invention that will suggest themselves to those skilled in the art, and it is also obvious that some portions may be used without the others.
Without enumerating variations and equivalents, I claim as my invention.

1. The combination of an alternating current generator driven by a variable and intermittent source of power, a static device for converting the generator current to unidirectional, translating devices, a storage battery which receives current from the unidirectional circuit when the generator speed is above a pre-determined value the battery supplying current to the translating devices when the generator speed falls below this value, means for so regulating the generator voltage as to send a predetermined charging current to the battery and means whereby the voltage at the translating devices is maintained substantially constant.

2. The combination of an alternating current generator driven by a variable and intermittent power source, a storage battery, translating devices, a static rectifier whereby the alternating current is converted to uni-directional, circuits and connections whereby the storage battery and translating devices are supplied by the rectified generator current when the generator speed is above a predetermined value, and the translating devices supplied from the storage battery when the speed is below this value, means for exciting the generator from the storage battery circuit, and means responsive to the electric condition of the storage battery whereby the voltage of the generator is controlled independently of its speed.

3. The combination of an alternating current generator driven from a variable and intermittent source of power, translating devices, a storage battery, a static rectifier in which the generator current is changed to uni-directional, circuits and connections whereby the storage battery and translating devices are supplied by the rectified generator current when the generator speed is above a predetermined value, means for exciting the generator field from the battery circuit, and means whereby the generator excitation is so varied as to give at the battery terminals a potential which causes charge of the battery at a variable rate, diminishing as battery approaches full charge.

4. The combination of an alternating current generator driven from a variable and intermittent source of power, translating devices, a storage battery, a static rectifier in which current from the generator is changed to unidirectional before passing to the battery and translating devices, means whereby the generator field winding is connected to the battery circuit when the generator speed is above a predetermined value, and disconnected therefrom when the generator speed is below said value, and means in the field circuit responsive to the electrical condition of the storage battery for controlling the voltage of the generator independently of its speed.

5. The combination of an alternating current generator driven by a variable and intermittent source of power, a mercury vapor rectifier whereby current from the generator is changed to uni-directional, translating devices, a storage battery, means for exciting the generator field from the storage battery, and automatic means controlled by current from the generator for starting ionization of the mercury vapor, which means become inoperative when unidirectional current flows from the rectifier.

6. The combination of an alternating current generator having a moving inductor and windings stationary with respect to said inductor, a variable and intermittent source of power whereby the inductor is driven, a mercury vapor rectifier to change the generator current to uni-directional, translating devices, a storage battery, circuits and connections whereby the storage battery and translating devices are supplied by rectified generator current, means whereby the generator field is excited from the battery when the generator is in motion and disconnected from the battery when the generator is at rest, means to regulate the generator voltage responsive to the electrical condition of the battery, and means for maintaining the voltage at the translating devices substantially constant.

In testimony hereof I hereto sign my name in the presence of two subscribing witnesses.

LAMAR LYNDON.

Witnesses:
ROBERT R. MARTEN,
H. CHITTEWAE.